United States Patent
Vinciarelli et al.

(10) Patent No.: US 6,608,770 B2
(45) Date of Patent: Aug. 19, 2003

(54) PASSIVE CONTROL OF HARMONIC CURRENT DRAWN FROM AN AC INPUT BY RECTIFICATION CIRCUITRY

(75) Inventors: Patrizio Vinciarelli, Boston, MA (US); Alan R. Rockenbach, Dunbarton, NH (US)

(73) Assignee: VLT Corporation, San Antonio, TX (US)

( * ) Notice: Subject to any disclaimer, the term of this patent is extended or adjusted under 35 U.S.C. 154(b) by 0 days.

(21) Appl. No.: 09/944,737

(22) Filed: Aug. 31, 2001

(65) Prior Publication Data

US 2003/0043607 A1 Mar. 6, 2003

(51) Int. Cl.[7] .............................. H02M 3/18; G05F 1/10
(52) U.S. Cl. ......................................... 363/61; 323/222
(58) Field of Search ............................ 363/61, 59, 126, 363/143, 26, 17, 125; 323/222, 282, 259, 290

(56) References Cited

U.S. PATENT DOCUMENTS

| | | | |
|---|---|---|---|
| 4,222,096 A | | 9/1980 | Capewell |
| 4,268,899 A | * | 5/1981 | Rokas .......................... 363/59 |
| 4,369,490 A | | 1/1983 | Blum |
| 4,677,366 A | | 6/1987 | Wilkinson et al. |
| 4,831,508 A | * | 5/1989 | Hunter .......................... 363/44 |
| 4,837,672 A | * | 6/1989 | Donze .......................... 363/143 |
| 4,855,890 A | | 8/1989 | Kammiller |
| 4,937,731 A | * | 6/1990 | Konopka ...................... 363/143 |
| 5,119,283 A | * | 6/1992 | Steigerwald et al. ........... 363/37 |
| 5,148,359 A | | 9/1992 | Nguyen |
| 5,224,029 A | | 6/1993 | Newman, Jr. |
| 5,321,348 A | | 6/1994 | Vinciarelli et al. |
| 5,383,109 A | * | 1/1995 | Maskimovic et al. ........ 323/222 |
| 5,526,234 A | | 6/1996 | Vinciarelli et al. |
| 5,661,348 A | * | 8/1997 | Brown .......................... 363/61 |
| 5,720,324 A | | 2/1998 | Vinciarelli |
| 5,722,467 A | | 3/1998 | Vinciarelli |
| 5,969,481 A | * | 10/1999 | Konopka ...................... 315/246 |
| 6,137,700 A | * | 10/2000 | Iida et al. ....................... 363/89 |

OTHER PUBLICATIONS

Redl, "Low–Cost Line Harmonics Reduction", APEC 95, Seminar 7, Dallas, March 1995, pp. 1–71.

* cited by examiner

Primary Examiner—Rajnikant B. Patel
(74) Attorney, Agent, or Firm—Fish & Richardson P.C.

(57) ABSTRACT

Passive circuitry for controlling the current drawn from an AC line and delivering a rectified voltage to a load includes a bridge rectifier, a filter capacitor, a range selector switch for configuring the rectifier and filter capacitor in either a full wave rectification or a voltage doubling configuration, and inductances between the rectifier and the capacitor. Inductances may be alternatively connected between the AC line and the rectifier.

A high packing density coupled inductor includes a thermally conductive encapsulant and base plate for removing heat from the inductor allowing smaller inductors to be used to achieve greater power densities.

A universal passive current control module includes two input terminals for connection to the AC input, a positive output terminal and a negative output terminal for connection to a load, a third output terminal for connection to a filter capacitance, and a thermally conductive encapsulant for filling the free space within the module. Passive internal circuitry includes rectifiers for receiving an AC input and delivering a rectified output, range selector circuitry connected to the third output terminal to effect voltage doubling, and range control circuitry for sensing the AC input level and controlling the range selector circuitry to activate the voltage doubling function when the AC input is below a threshold. The module requires a filter capacitance to be connected to the third output terminal for voltage doubling.

A three-plate capacitor provides reduced ESR losses further reducing the size and increasing the power density of the circuit.

47 Claims, 17 Drawing Sheets

FIG. 8A

230 V 50 Hz INPUT,
NO INDUCTOR

LOAD POWER = 371.9 WATTS
LOAD CURRENT = 1.617 A, rms
HARMONIC CURRENT = 5.731 A, rms

| HARMONIC NO. | rms, CURRENT |
|---|---|
| 3 | 1.576 A |
| 5 | 1.482 A |
| 7 | 1.351 A |
| 9 | 1.189 A |
| 11 | 1.006 A |
| 13 | 0.814 A |
| 15 | 0.626 A |

FIG. 8B

120 V 60 Hz INPUT,
NO INDUCTOR

LOAD POWER = 372.3 WATTS
LOAD CURRENT = 1.619 A, rms
HARMONIC CURRENT = 4.791 A, rms

| HARMONIC NO. | rms, CURRENT |
|---|---|
| 3 | 2.93 A |
| 5 | 2.555 A |
| 7 | 2.058 A |
| 9 | 1.507 A |
| 11 | 0.972 A |
| 13 | 0.51 A |
| 15 | 0.162 A |

FIG. 8C

230 V 50 Hz INPUT,
SERIES INDUCTORS BEFORE RECTIFIER

LOAD POWER = 371.9 WATTS
LOAD CURRENT = 1.617 A, rms
HARMONIC CURRENT = 3.906 A, rms

| HARMONIC NO. | rms, CURRENT |
|---|---|
| 3 | 1.36 A |
| 5 | 0.889 A |
| 7 | 0.423 A |
| 9 | 0.14 A |
| 11 | 0.128 A |
| 13 | 0.106 A |
| 15 | 0.05734 A |

FIG. 8D

**120 V 60 Hz INPUT,
PARALLEL INDUCTORS BEFORE RECTIFIERS**

LOAD POWER = 371.6 WATTS
LOAD CURRENT = 1.616 A, rms
HARMONIC CURRENT = 3.523 A, rms

| HARMONIC NO. | rms, CURRENT |
|---|---|
| 3 | 2.688 A |
| 5 | 1.926 A |
| 7 | 1.087 A |
| 9 | 0.404 A |
| 11 | 0.146 A |
| 13 | 0.227 A |
| 15 | 0.171 A |

FIG. 8E

**230 V 50 Hz INPUT,
INDUCTORS AFTER RECTIFIER**

LOAD POWER = 371.2 WATTS
LOAD CURRENT = 1.614 A, rms
HARMONIC CURRENT = 3.314 A, rms

| HARMONIC NO. | rms, CURRENT |
|---|---|
| 3 | 1.358 A |
| 5 | 0.886 A |
| 7 | 0.418 A |
| 9 | 0.136 A |
| 11 | 0.124 A |
| 13 | 0.102 A |
| 15 | 0.05374 A |

FIG. 8F

**120 V 60 Hz INPUT,
INDUCTORS AFTER RECTIFIER**

LOAD POWER = 372.7 WATTS
LOAD CURRENT = 1.620 A, rms
HARMONIC CURRENT = 2.853 A, rms

| HARMONIC NO. | rms, CURRENT |
|---|---|
| 3 | 2.449 A |
| 5 | 1.354 A |
| 7 | 0.433 A |
| 9 | 0.205 A |
| 11 | 0.215 A |
| 13 | 0.09371 A |
| 15 | 0.09334 A |

US 6,608,770 B2

PASSIVE CONTROL OF HARMONIC CURRENT DRAWN FROM AN AC INPUT BY RECTIFICATION CIRCUITRY

TECHNICAL FIELD

This invention relates to the field of power conversion, and more particularly to the fields of controlling the current drawn from an AC input by rectification circuitry, power factor correction and reducing harmonic currents.

BACKGROUND

When the voltage from an AC power source is rectified to produce a DC voltage, as is commonly done in AC-line-powered electronic equipment, the harmonic content of the current drawn from the AC power source, and the power factor that the equipment presents to the AC line, will depend on the rectification method used. Capacitively loaded rectifiers, such as bridge rectifier 10 connected to filter capacitors 16 and 18 as shown in FIG. 1, conduct a large peak current during a small fraction of each AC power line cycle during which energy is delivered to the DC storage capacitors 16, 18. The current drawn by such a rectifier and filter capacitor circuit is rich in harmonics that contribute to power losses in the power distribution wiring without contributing to delivery of real power to the load.

Equipment designed to operate on worldwide AC power lines will typically need to operate over a total range of operating line voltages between 90 VAC and 270 VAC, rms, the lower segment of the range (90 to 135 VAC, rms) being typical of US and Japanese AC utility lines and the higher segment of the range (180 to 270 VAC) being typical of European lines. To accommodate both voltage ranges, the rectifier-capacitor circuit may include a range selection circuit to maintain the average value of the load voltage, $V_{DC}$, within a range of approximately 250 to 380 VDC. Referring to FIG. 1, the range selection circuit may include a switch 12 which when open configures the rectifier as a bridge rectifier loaded by the series combination of capacitors 16 and 18. When closed, the switch 12 configures the rectifier as a half wave rectifier individually charging capacitor 16 during the positive half cycles and capacitor 18 during the negative half cycles. The rectifier-capacitor circuit thus functions as a voltage doubler when the switch 12 is closed. The switch 12 may be controlled either manually or automatically.

One way to control the harmonic content of the current drawn from an AC power source is to use high frequency switching "power factor correction" ("PFC") circuitry or converters to control the waveform of the AC current to closely conform to the waveform of the AC source voltage. High frequency switching PFC circuitry is discussed in U.S. Pat. No. 5,321,348, entitled "Boost Switching Power Conversion" by Vinciarelli et al. and U.S. Pat. No. 4,677,366 entitled "Unity Power Factor Supply" by Wilkinson. Referring to FIG. 2, another PFC approach uses an inductor 14 between the AC power source and the rectifier to reduce the harmonic content of the current drawn from the AC source. In another variation, described in U.S. Pat. No. 4,831,508, entitled "Power Supply System Having Improved Input Power Factor," by Hunter, a voltage range switch is used to configure two inductors on the input side of the bridge rectifier either in series or in parallel and a line frequency operated shunt switch is used to enhance the effectiveness of the PFC circuit of FIG. 2. Each approach presents trade-offs such as higher cost and reduced efficiency of high frequency switching PFC converters, increased size and weight with passive approaches, and the higher cost and size and weight penalties of the low frequency switched PFC circuits.

SUMMARY

The invention passively controls the current drawn from an AC input and delivers a DC voltage to a load.

Thus, in general, in one aspect the invention features a rectifier having inputs for receiving power from the AC input and outputs for delivering a rectified output. An output filter capacitance is connected across the load and an inductance is connected between the rectifier and the capacitor. A switch is connected to effect voltage doubling in a second position.

In general, in another aspect, the invention features a rectifier having inputs for receiving power from the AC input and outputs for delivering a rectified output and an output filter capacitance is connected across the load. First and second inductances are connected to carry current from the rectifier output to the capacitance. A switch is connected to allow current to flow in the first and second inductances during both half cycles of the AC input with the switch in a first position and to prevent current from flowing in the first inductor during negative half cycles and in the second inductor during positive half cycles with the switch in a second position.

In general, in another aspect, the invention features a bridge rectifier having a first and a second input for receiving power from the AC input, a positive output, and a negative output and two capacitances each having one plate connected to a center tap and one plate connected to a respective end tap. A first inductance is connected in series between the positive output of the bridge rectifier and a first end tap and a second inductance is connected in series between the negative output of the bridge rectifier and second end tap. A range switch is connected in series between the second input of the bridge rectifier and the center tap for doubling the output voltage when the switch is closed. The first and second end taps are connected to feed the load.

Implementations of the general invention may include one or more of the following features. The inductances may be magnetically coupled to provide mutual inductance. The inductances may be poled such that the flux generated by a current flowing from the positive output of the bridge rectifier to the first end tap aid the flux generated by a current flowing from the second end tap to the negative output of the bridge rectifier. The inductances may be the same. The first inductance may carry current during the positive half cycles of the AC input and the second inductance may carry current during the negative half cycles of the AC input. The first and second inductances may carry current during every half cycle of the AC input. The switch may be a single-pole switch. The capacitance may be a three-plate integrated capacitor. The inductance may be enclosed in a thermally conductive encapsulant-filled enclosure. The enclosure may include a thermally conductive base plate. The rectifier may be encapsulated with the inductances in the enclosure. Control circuitry for the switch may be encapsulated with the inductances in the enclosure. The capacitances may be physically external to the inductance enclosure. Switch control circuitry for sensing the AC input voltage level may operate the switch to effect voltage doubling when the level is below a predetermined threshold. The rectifier, switch, and switch control circuitry may be packaged in a first module. The inductances may be packaged in a second module. The modules may include a base plate and be filled with a thermally conductive encapsulant for removing heat. The capacitances may be physically external to the first and second modules. The inductances may have an inductance value that causes attenuation of odd current harmonics by at least 8 percent compared to an equivalent apparatus with zero inductance. The inductances have an inductance value that causes attenuation of current harmonics in an amount sufficient satisfy the requirements of EN61000-3-2 compared to an equivalent apparatus with zero inductance.

In general, in another aspect, the invention features a rectifier having first and second inputs for receiving power from the AC input and outputs for delivering a rectified output. A first inductance is connected between the first input and the AC input and a second inductance is connected between the second input and the AC input. An output filter capacitance is connected across the load and a switch is connected to effect voltage doubling in a second position.

Implementations of the general invention may include one or more of the following features. The rectifier may be a bridge rectifier. The switch may bypass the second inductor in the second position. The rectifier may be connected as a full wave rectifier when the switch is a first position. The current may flow in the first and second inductances when the switch is in the first position and only in the first inductor when the switch is in the second position. The filter capacitance may include a first capacitance and a second capacitance connected in series at a center tap. The apparatus switch, when in the second position, may provide a closed circuit between the center tap and one side of the AC input. The filter capacitance may be a three-plate integrated capacitor. The inductance of the first inductor may equal the inductance of the second inductor and the resistance of the first inductor may be less than the resistance of the second inductor. The resistance of the first inductor may be half of the resistance of the second inductor. The inductors may be magnetically coupled to provide a mutual inductance. The inductors may be poled such that the flux generated by a current flowing in the first inductor from the AC input to the rectifier aids the flux generated by a current flowing in the second inductor from the rectifier to the AC input. Switch control circuitry for sensing the AC input voltage level may operate the switch to effect voltage doubling when the level is below a predetermined threshold. The rectifier, switch, and switch control circuitry may be packaged in a first module. The inductances may be packaged in a second module. The modules may include a base plate and be filled with a thermally conductive encapsulant for removing heat. The capacitances may be physically external to the first and second modules. The inductances may have an inductance value that causes attenuation of odd current harmonics by at least 8 percent compared to an equivalent apparatus with zero inductance. The inductances have an inductance value that causes attenuation of current harmonics in an amount sufficient satisfy the requirements of EN61000-3-2 compared to an equivalent apparatus with zero inductance.

In general, in another aspect, the invention features a rectifier having first and second inputs for receiving power from the AC input and outputs for delivering a rectified output. A series circuit, including a first inductance and a second inductance connected at a center tap is connected between the AC input and the second input. An output filter capacitance is connected across the load and a switch is connected to the center tap to effect voltage doubling in a second position.

In another aspect the invention features a three-plate integrated capacitor.

In another general aspect, the invention features two inductors enclosed in an encapsulant filled enclosure. The enclosure may include a thermally conductive base plate. A rectifier may be encapsulated with the inductances in the enclosure. Control circuitry may be encapsulated with the inductances in the enclosure. The capacitances may be physically external to the inductance enclosure. The encapsulated module may provide passive harmonic current reduction to meet applicable international requirements with high power density (i.e., 200 Watt/cubic inch) and high efficiency (i.e., greater than 95%).

In general, in another aspect, the invention features a thermal management enclosure housing internal circuitry. The housing includes a thermally conductive base plate, an electrically insulative cover, input terminals for connection to an AC input, output terminals for connection to a load, and a thermally conductive encapsulant for filling the free space within the enclosure. The internal circuitry includes a rectifier having inputs connected to the input terminals for receiving power from the AC input and outputs for delivering a rectified output. An inductance is connected between the outputs of the rectifier and the output terminals and a switch is connected to effect voltage doubling in a second position.

Implementations of the invention may include one or more of the following features. The internal circuitry may include a switch controller connected to control the switch. The internal circuitry may require a filter capacitor to be connected to the output terminals for the voltage doubling.

In general, in another aspect, the invention features a thermal management module including at least two input terminals for connection to the AC input, a positive output terminal and a negative output terminal for connection to a load, a third output terminal for connection to a filter capacitance, and a thermally conductive encapsulant for filling the free space within the module. Passive internal circuitry includes rectifiers for receiving an AC input and delivering a rectified output, range selector circuitry connected to the third output terminal to effect voltage doubling, and range control circuitry for sensing the AC input level and controlling the range selector circuitry to activate the voltage doubling function when the AC input is below a threshold. The module requires a filter capacitance to be connected to the third output terminal for voltage doubling.

Implementations of the invention may include one or more of the following features. The module may further require an external inductance to control the current drawn from the AC input. The internal circuitry may include an inductance to control the current drawn from the AC input. The inductances may have an inductance value that causes attenuation of odd current harmonics by at least 8 percent compared to an equivalent apparatus with zero inductance. The inductances have an inductance value that causes attenuation of current harmonics in an amount sufficient satisfy the requirements of EN61000-3-2 compared to an equivalent apparatus with zero inductance. The internal circuitry may require two filter capacitors, one connected between the positive and third outputs and the other connected between the negative and third outputs.

The module may perform passive power factor correction. The module may perform passive harmonic current control.

In general, in another aspect, the invention features at least two inputs for receiving power from an AC source and at least two outputs for delivering the rectified voltage to the load.

Unidirectional conduction paths between the input and output rectify the AC input. At least one filter capacitance is connected across the output. First and second inductances are connected to carry current between the input and the load and have an inductance value, L, which causes attenuation of odd harmonic currents drawn from the input by at least eight percent compared to an equivalent apparatus having zero inductance. A switch is connected to in a second position to effect voltage doubling and prevent current from flowing in one of the inductances.

Implementations of the invention may include one or more of the following features.

The switch may prevent current from flowing in the second inductance during positive and negative half cycles of the AC input. The switch may prevent current from flowing in the first inductance during positive half cycles and in the second inductance during negative half cycles of the AC input.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 8A–8F show operational parameter values for the circuits of FIGS. 1, 3, and 6.

DETAILED DESCRIPTION

The invention will be described with reference to the figures in which like reference designations in the various drawings indicate like elements.

Although electronic PFC circuits can reduce the harmonic content of an AC current to a very low level, their benefit is offset by their relatively low conversion efficiency, which is typically less than 90% at an input of 90 VAC, rms. Furthermore, because electronic PFC circuits use active control and switching techniques, they are, relative to passive components, more prone to electrical or thermal failure and relatively more complex and costly to manufacture.

Passive current control and passive PFC (collectively passive "current control"), using inductance interposed between the AC source and the storage capacitors, is robust, reliable and relatively inexpensive. The physical size of the inductor, however, is dependent upon the required AC operating voltage range, because, for any given value of load, the rms current in the inductor will vary inversely with the AC source voltage and the dissipation in the inductor will vary as the square of the current. For example, for a given load, dissipation in the inductor 14 of FIG. 2 at 90 VAC will be 9 times the dissipation at 270 VAC. Thus, where a single inductor is to be used over a worldwide range of AC voltages, the inductor size will depend on the power drawn by the load, the maximum allowable power loss in the inductor, and the minimum AC operating voltage. For products designed to operate over a worldwide voltage range, a size penalty is paid by users whose operation is limited to the high end of the range.

Figure 3:
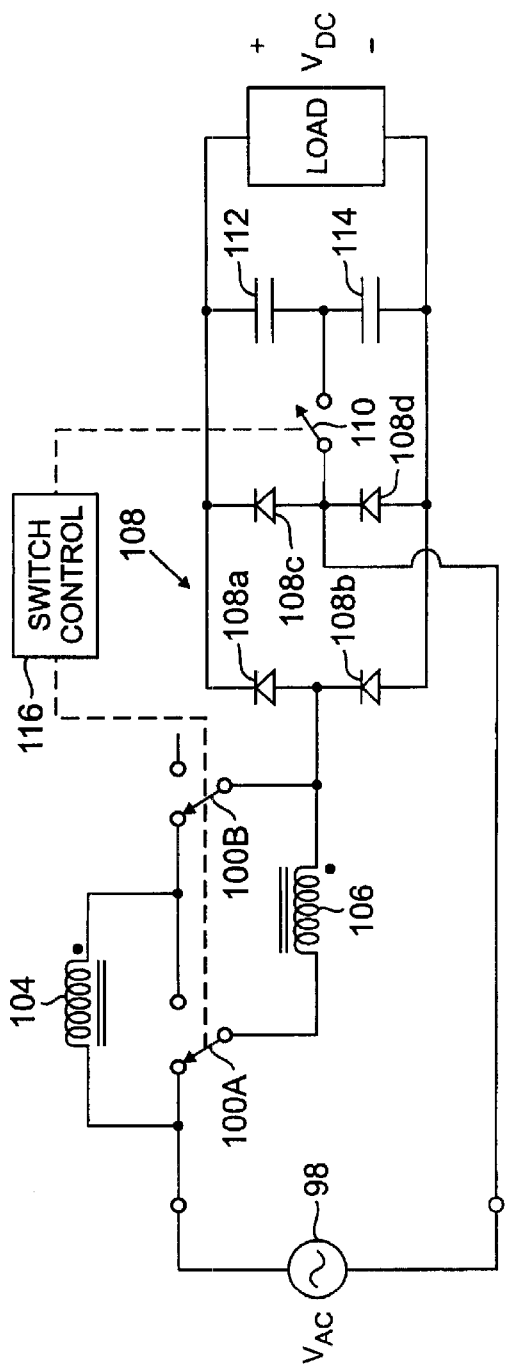
FIG. 3 is a schematic diagram of a current control circuit with inductors on the AC side of the rectifier.

A passive current control circuit is shown in FIG. 3. In the figure, a double-pole-double-throw switch (comprising switches 100A and 100B) is connected to two inductors, 104 and 106. Bridge rectifier 108 (comprising rectifier diodes 108A, 108B, 108C, 108D) and storage capacitors 112, 114 form a conventional capacitive input rectifier. Switch 110 is a voltage range selection switch. Switches 100A, 100B and 110 are controlled by switch controller 116.

Figure 4:
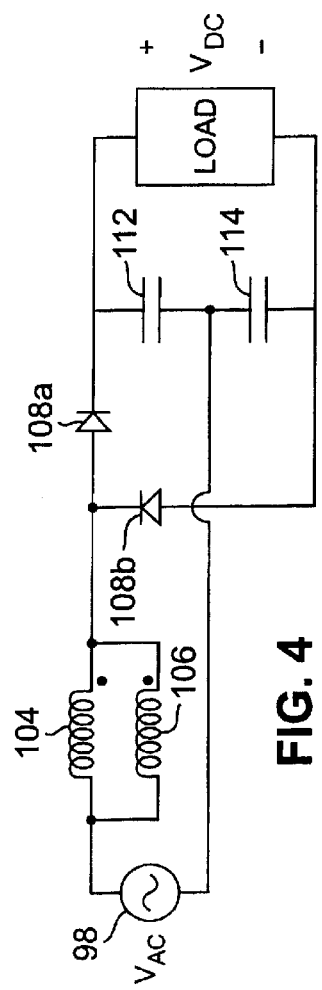
FIG. 4 is an equivalent circuit of the circuit of FIG. 3 with the switch closed.
Figure 5:
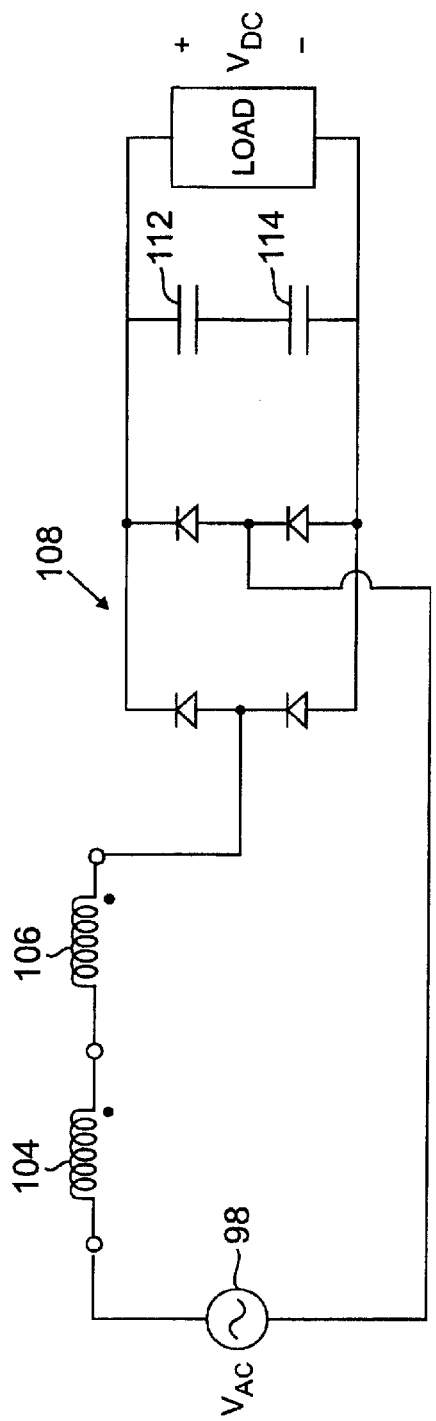
FIG. 5 is an equivalent circuit of the circuit of FIG. 3 with the switch open.

When the line voltage is relatively low (e.g., between 90 and 135 VAC, rms) switch controller 116 closes switch 110 and sets switches 100A and 100B to the positions shown in FIG. 3, resulting in a configuration having the equivalent circuit shown in FIG. 4. In FIG. 4, inductors 104 and 106 are connected in parallel and the rectifiers 108a, 108b and storage capacitors 112, 114 form a "voltage doubler" rectification circuit. For relatively high line voltages, (e.g., between 180 and 270 VAC, rms) switch controller 116 opens switch 110 and sets switches 100A and 100B to the opposite of the positions shown in FIG. 3, resulting in a configuration having the equivalent circuit shown in FIG. 5. In FIG. 5, inductors 104 and 106 are connected in series and the rectifier 108 and storage capacitors 112, 114 form a full-bridge rectification circuit.

Figure 2:
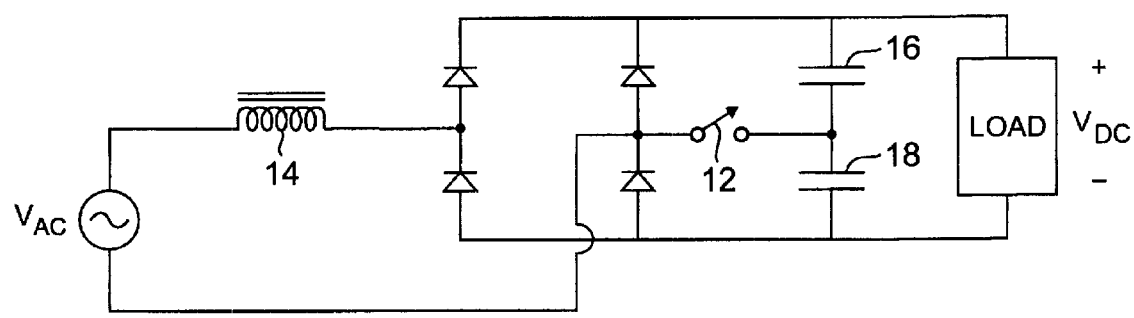
FIG. 2 is a schematic diagram of a rectifier circuit with a series inductor.

In the circuit of FIG. 3, if the two inductors 104, 106, are essentially identical, the dissipation at 90 VAC (with the inductors connected in parallel) will be 2.25 times greater than the dissipation at 270 VAC (with the inductors connected in series), which is a fourfold improvement relative to the circuit of FIG. 2. This is because the paralleled inductors in the circuit of FIG. 3 (at relatively low line voltages) have one-quarter of the equivalent series resistance of the inductors in series (at relatively high line voltages).

Figure 6B:
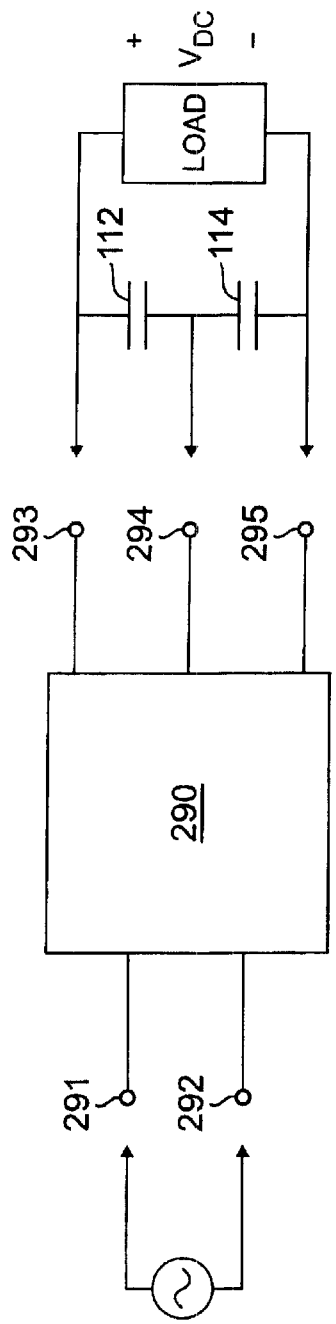
FIG. 6B is a schematic diagram of the circuit of FIG. 6A implemented using a passive current control module.
Figure 6A:
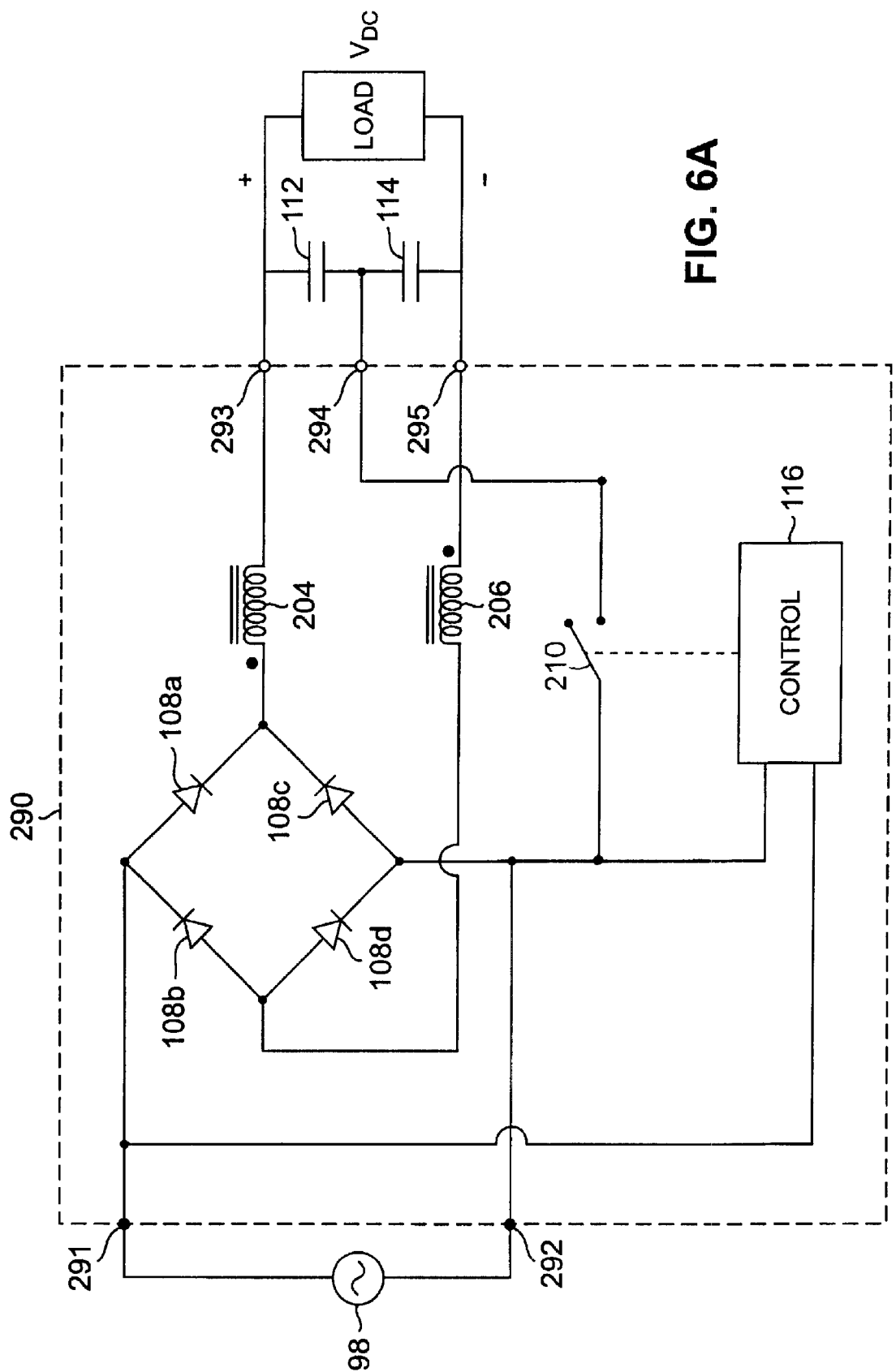
FIG. 6A is a schematic diagram of a current control circuit with inductors on the DC side of the rectifier.

Another passive current control circuit is shown in FIG. 6A. In the figure, the circuit comprises a pair of inductors 204, 206 connected between a full wave rectifier 108 and storage capacitors 112, 114. A range selection switch 210 is closed for relatively low line voltages (e.g., between 90 and 135 VAC, rms) and is opened for relatively high line voltages, (e.g., between 180 and 270 VAC, rms). The circuit of FIG. 6A does not require the use of switches 100, 102, in FIG. 3 to reconfigure the inductors when the input voltage range is changed. The circuit of FIG. 6A therefore has the advantage of requiring only a single-pole single-throw switch compared to the three-pole switch required by the circuit of FIG. 3. A switch control circuit 116 senses the input voltage level and automatically closes the range selector switch 210 when the average input voltage falls below a predetermined threshold level. Alternatively, the switch may be controlled manually in which case the switch control circuit 116 may be omitted.

In the circuit of FIG. 6A, if the two inductors 204, 206 are essentially identical, the dissipation at 90 VAC (with the range selector switch closed) will be 4.5 times greater than the dissipation at 270 VAC (with the range selector switch open), which is a twofold improvement relative to the circuit of FIG. 2. This is because, at relatively high line voltages, with the range selector switch open, each inductor conducts during both halves of each cycle of the AC source 98, whereas at relatively low line voltages, with the range selector switch closed, each inductor in the circuit of FIG. 6A conducts during only one-half of each cycle of the AC source.

Figure 7A:
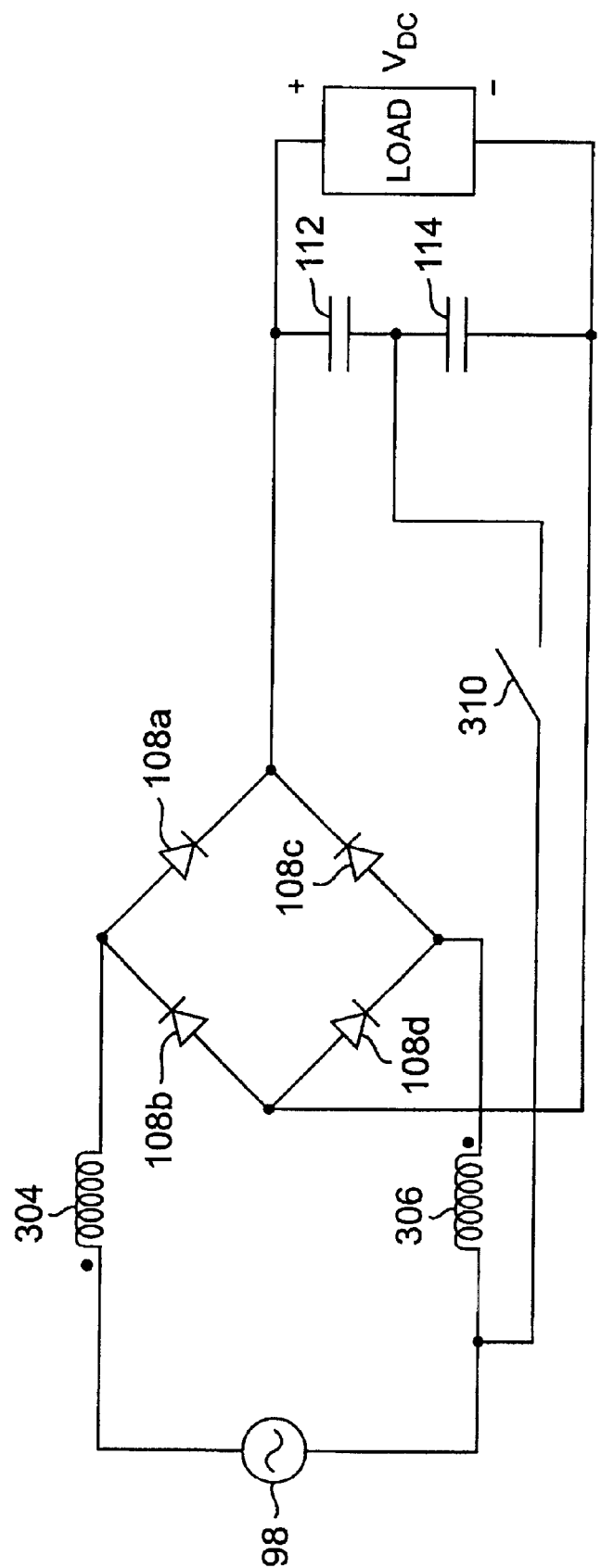
FIGS. 7A and 7B are schematic diagrams of alternate current control circuits with the inductors on the AC side of the rectifier.

Another passive current control circuit is shown in FIG. 7A. In the Figure, the circuit comprises a pair of inductors 304, 306 connected between the AC voltage source and the full wave rectifier 108. Storage capacitors 112, 114 are connected across the load, which is fed by the rectifier 108. A range selection switch 310 is closed for relatively low line voltages (e.g., between 90 and 135 VAC, rms) and is opened for relatively high line voltages, (e.g., between 180 and 270 VAC, rms). The circuit of FIG. 7A also has the advantage of requiring only a single-pole single-throw switch compared to the three-pole switch required by the circuit of FIG. 3. Switching of the range selector switch 310 may be done manually or automatically by means of a switch control circuit (not shown).

At the higher input voltage, when switch 310 is open, both inductors 304, 306 carry the input current, I, in both halves of the AC cycle (when the bridge diodes are conducting). However, at the lower input voltage, when switch 310 is closed, only one of the inductors, inductor 304, will carry the input current. With two identical inductors each having a resistance R, the $I^2R$ losses will be distributed evenly between the two inductors 304, 306 when the switch is open. In the doubler mode, when switch 310 is closed, the input current will increase to 2I (by a factor of 2) for the same power level delivered to the load (assuming the lower input voltage is one half of the higher input voltage) yielding $I^2R$ losses four times greater in inductor 304 than when the switch is open. Since only one inductor 304 is carrying the input current, the total resistance is reduced by a factor of two and the total $I^2R$ losses across both inductors increases by a factor of two.

The dissipation in the inductors may be distributed differently by appropriately scaling the resistance of the windings. It may be advantageous to fabricate inductor 304 using a heavier gauge winding than is used for inductor 306 reducing the resistance of inductor 304, for example, to one half or one third of the resistance of inductor 306. Assuming that inductor 304 has one half (R/2) of the resistance, R, of inductor 306, the $I^2R$ losses will be distributed as $I^2R/2$ in inductor 304 and $I^2R$ in inductor 306 when the switch 30 is opened at high input voltages. When the switch is closed and the input current doubles, only $2(I^2R)$ will be dissipated in inductor 304 compared to the $4(I^2R)$ with identical inductors. The total $I^2R$ loss in both inductors is $1.5(I^2R)$ for when the switch is open versus $2(I^2R)$ for when the switch is closed. One way of budgeting the inductor resistance is to allocate two thirds of the winding volume to inductor 304 and one third to inductor 306. The core volume for the two inductors should remain the same since the ampere-turns will not change whether the switch is open or closed. In the example of FIG. 9 (discussed below), the core volume occupies approximately 60% of the inductor volume with the winding occupying approximately 40% of the inductor volume.

Figure 7B:
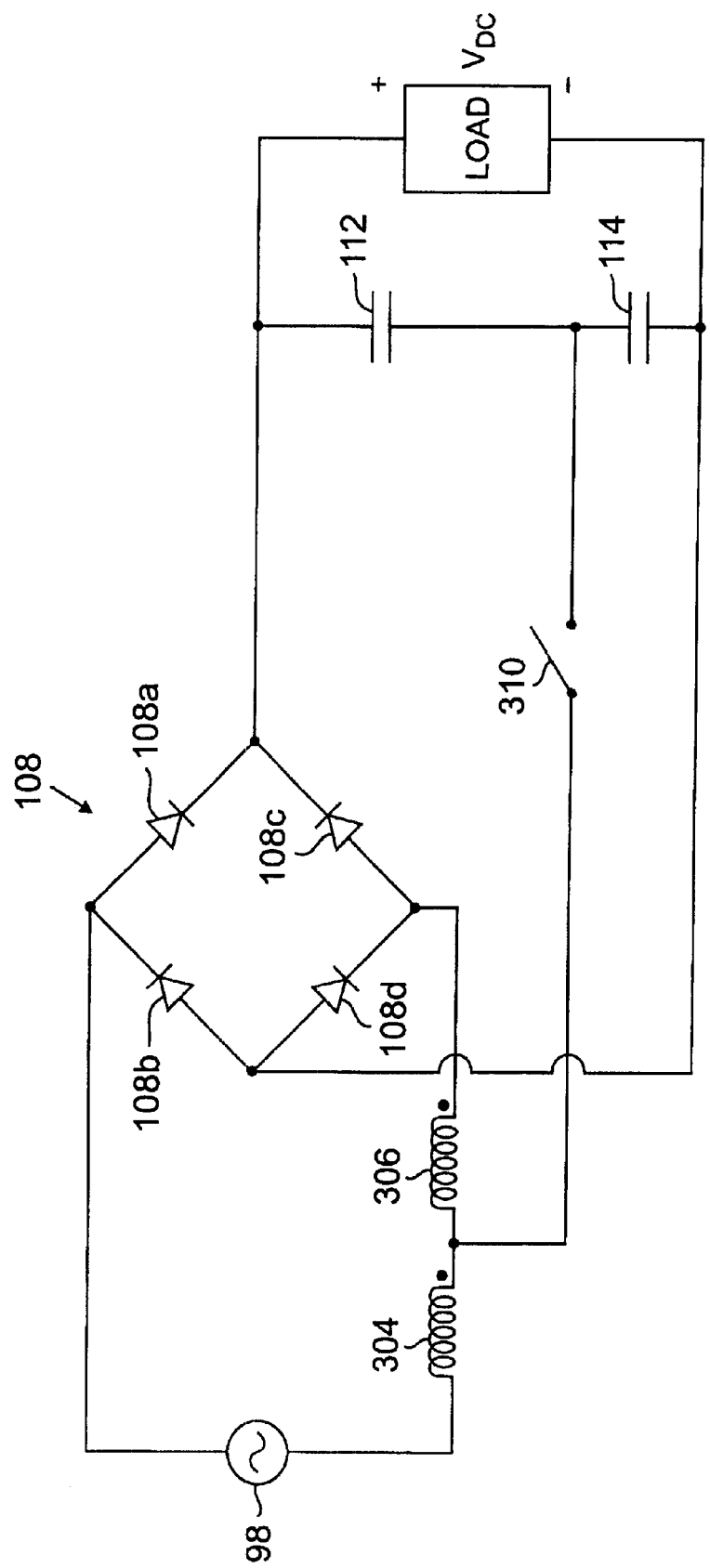

Another passive current control circuit is shown in FIG. 7B in which the two inductors 304, 306 are connected in series between the AC voltage source and the full wave rectifier 108. Storage capacitors 112, 114 are connected across the load, which is fed by the rectifier 108. A range selection switch 310 is closed for relatively low line voltages (e.g., between 90 and 135 VAC, rms) and is opened for relatively high line voltages, (e.g., between 180 and 270 VAC, rms). The circuit of FIG. 7B functions in the same way and has the same advantages as the circuit of FIG. 7A but adds the further advantage of allowing a unitary three-terminal inductor to be used. Switching of the range selector switch 310 may be done manually or automatically by means of a switch control circuit (not shown).

Figure 9A:
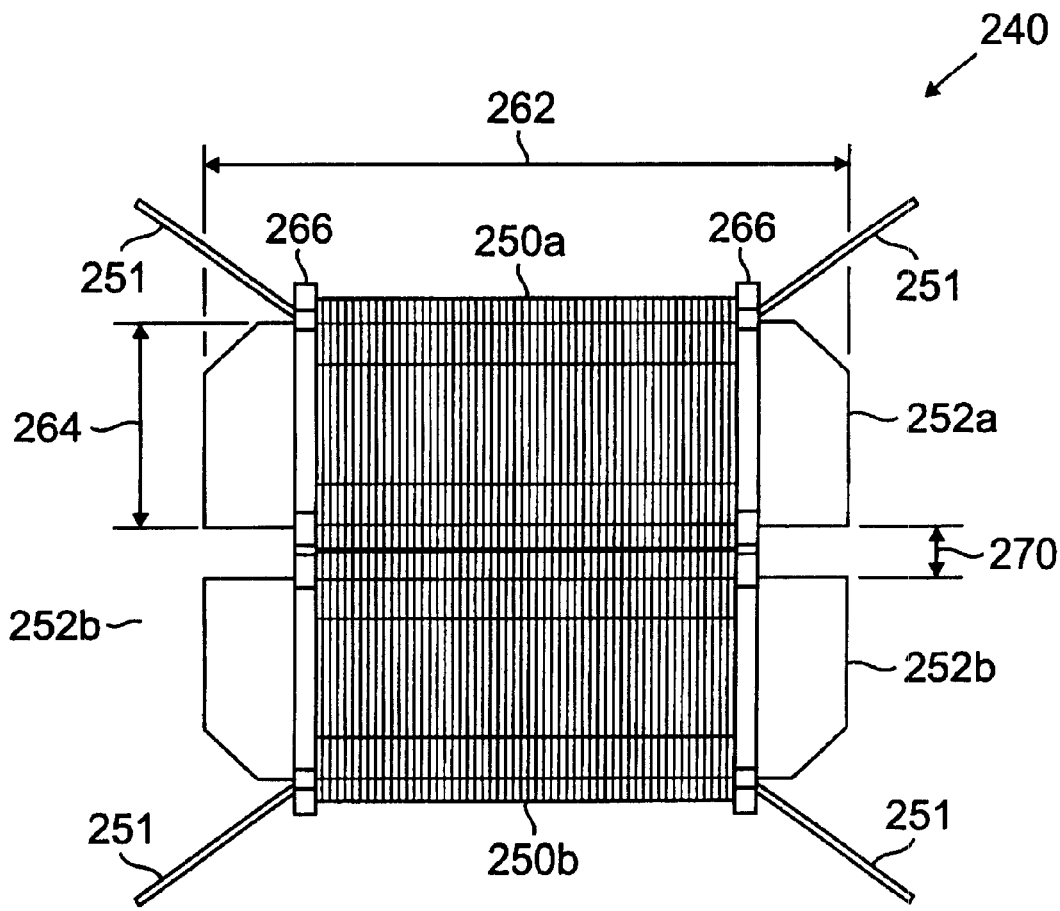
FIGS. 9A and 9B are top and side views, respectively, of a pair of coupled inductors.
Figure 9B:
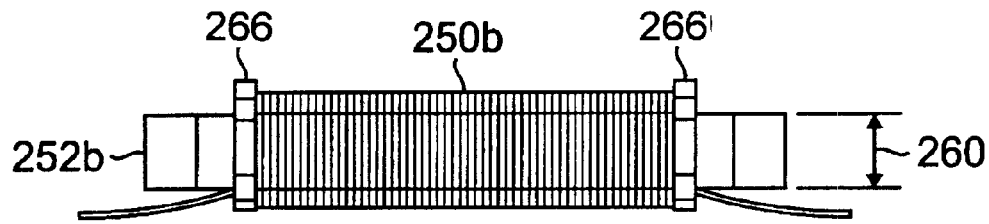

FIGS. 9A and 9B show top and side views of an inductor 240 which comprises two identical coils 250a, 250b wound on two identical magnetic core pieces 252a, 252b. Each coil consists of 165 turns of #24 AWG enamel-insulated wire wound in three layers of 55 turns each. The ends of the coil 251 are used to make electrical connection with the circuit. Each core piece consists of a stack of 17 pieces of 0.014-inch thick M6 steel laminate, for a total nominal core piece thickness, 260, of 0.238 inch. The steel laminate is manufactured by Thomas & Skinner, Inc., Indianapolis, Ind., USA. The length, 262, and width, 264, of each of the core pieces are 1.9 inch and 0.65 inch, respectively. The core pieces are located adjacent to each other by means of nonmagnetic spacers, 266. The spacing between the core pieces, 270, is 0.155 inch.

Figure 10A:
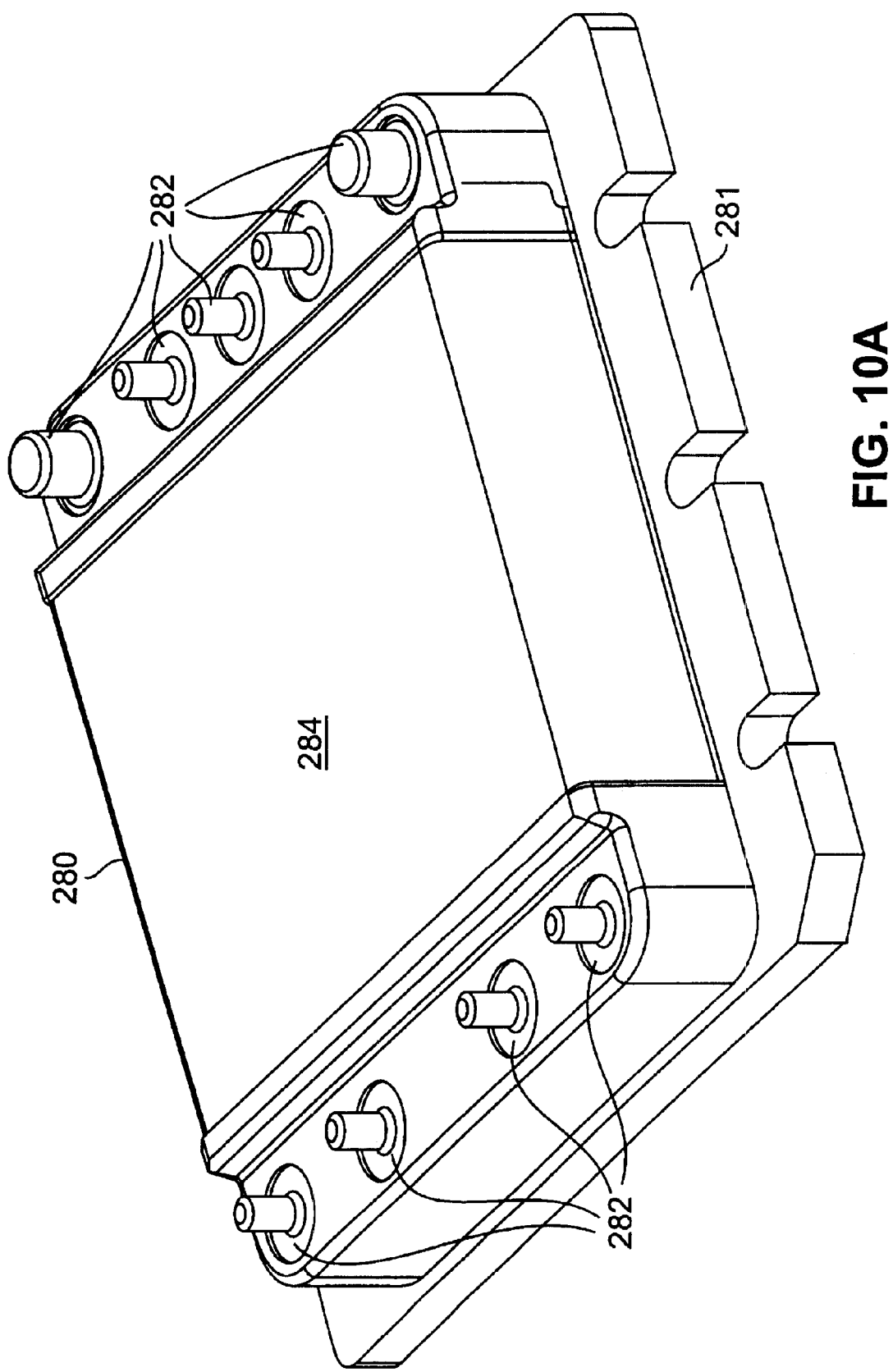
FIG. 10A is a perspective view of the inductor of FIG. 9 in a modular thermally conductive package.
Figure 10B:
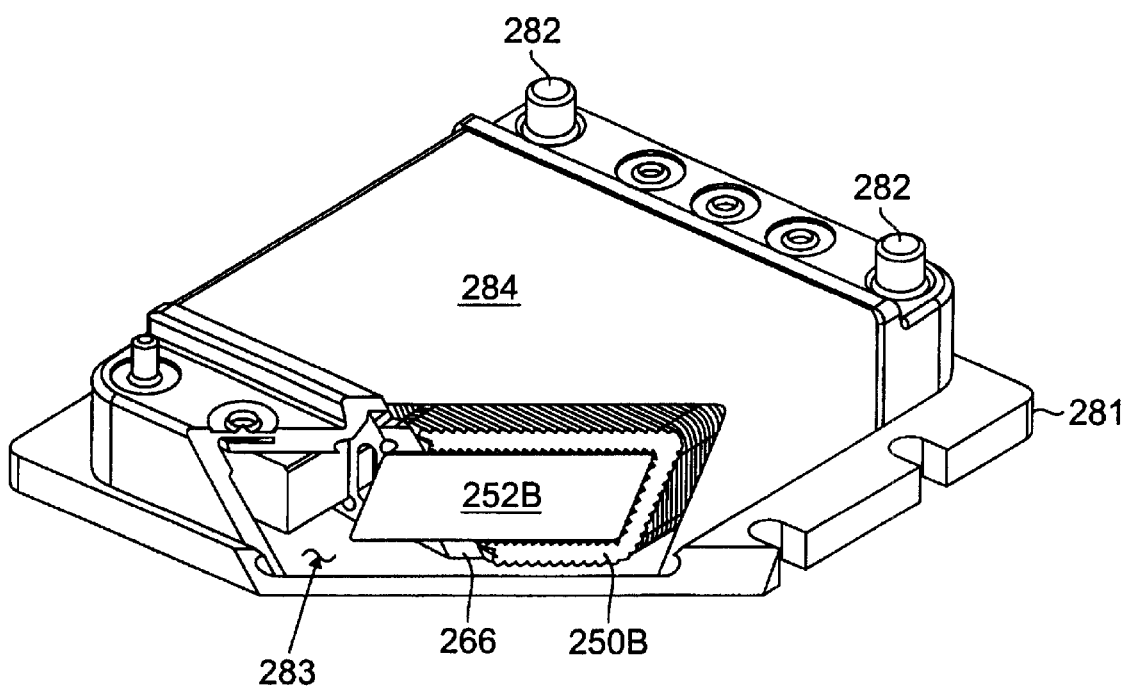
FIG. 10B is a perspective partial cross-sectional view of the thermally conductive package of FIG. 11A.
Figure 10C:
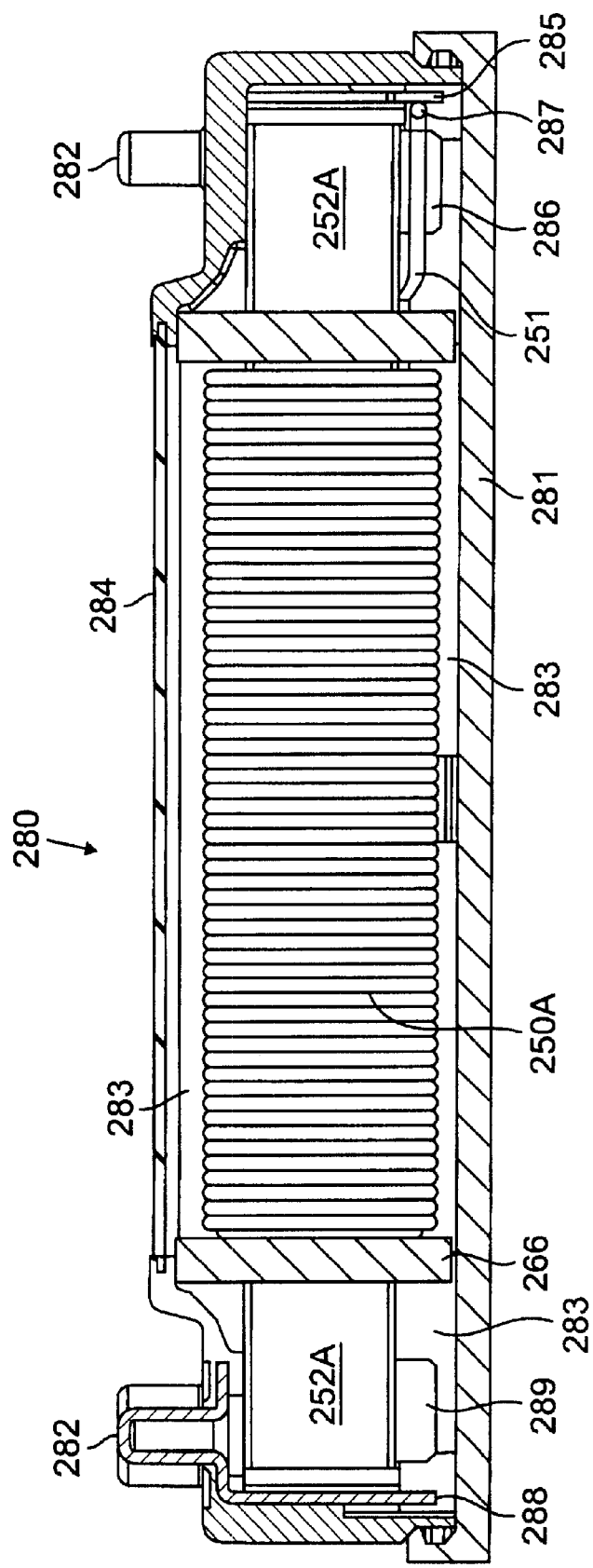
FIG. 10C is side cross-sectional view of the inductor of FIGS. 3–7B.

Referring to FIGS. 10A, 10B, and 10C, a thermal management module 280 for housing inductors 104, 106, 204, 206, 304, and 306 is shown. The inductor 240 of FIGS. 9A and 9B is particularly well adapted for integration into the thermal management module 280. The module 280 includes an electrically insulative cover 284 having contact terminals 282 for making electrical connection with the inductor windings. Although nine terminals are shown in FIG. 10A, a greater or lesser number of terminals may be used. A thermally conductive base plate 281, made of aluminum for example, is used to mount the enclosure to a heat sink (not shown).

FIG. 10B shows a partial cross-section of the module 280 revealing inductor core 252B, winding 250B and spacer 266, of FIG. 9. A version of the module 280 having four terminals 282 is shown in FIG. 10B (i.e., without the center terminals). A thermally conductive encapsulant 283, such as a two-part silicone (manufactured by Thermoset/Lord Corporation, East Weymouth, Mass., product designation SC-314) is preferably used to fill the empty space in the enclosure cavity. A preferred enclosure and method of filling the assembly are described in U.S. Pat. Nos. 5,526,234, and entitled "Packaging Electrical Components" by Vinciarelli et al. and U.S. Pat. Nos. 5,720,324 and 5,722,467, entitled "Filling of Assemblies" by Vinciarelli (all incorporated by reference). Referring to the side cross-sectional view of FIG. 10C, the inductor fits in the cover 284 with the spacers 266 abutting the edges of the cover to hold the inductor in position. During assembly, the inductor may be optionally affixed to the cover using dots of epoxy. The terminals 282 have extensions 285, 286, 288, and 289 that extend downward from the top of the module into the cavity for connection (for example by soldering) with the wires 251 of the inductor windings, 250a, 250b. One such connection 287 is shown between wire 251 and contact extension 285.

The module 280 provides an improved mechanism for removing heat from the inductor windings 250 and core 252 through the encapsulant 283 and the base plate 281 to a heat sink (not-shown). Improved heat removal allows smaller windings to be used for a given load thus increasing the power density. The encapsulated module can be used to provide passive harmonic current reduction for meeting applicable international requirements (for example, European Standard EN61000-3-2/A14 Specification, October 2000, "Electromagnetic Compatibility Limits for Harmonic Current Emissions," published by European Committee for Electrotechnical Standardization (CENELEC), Brussels, Belgium) with high power density (i.e., 200 Watt/cubic inch) and high efficiency (i.e., greater than 95%).

Figure 10D:
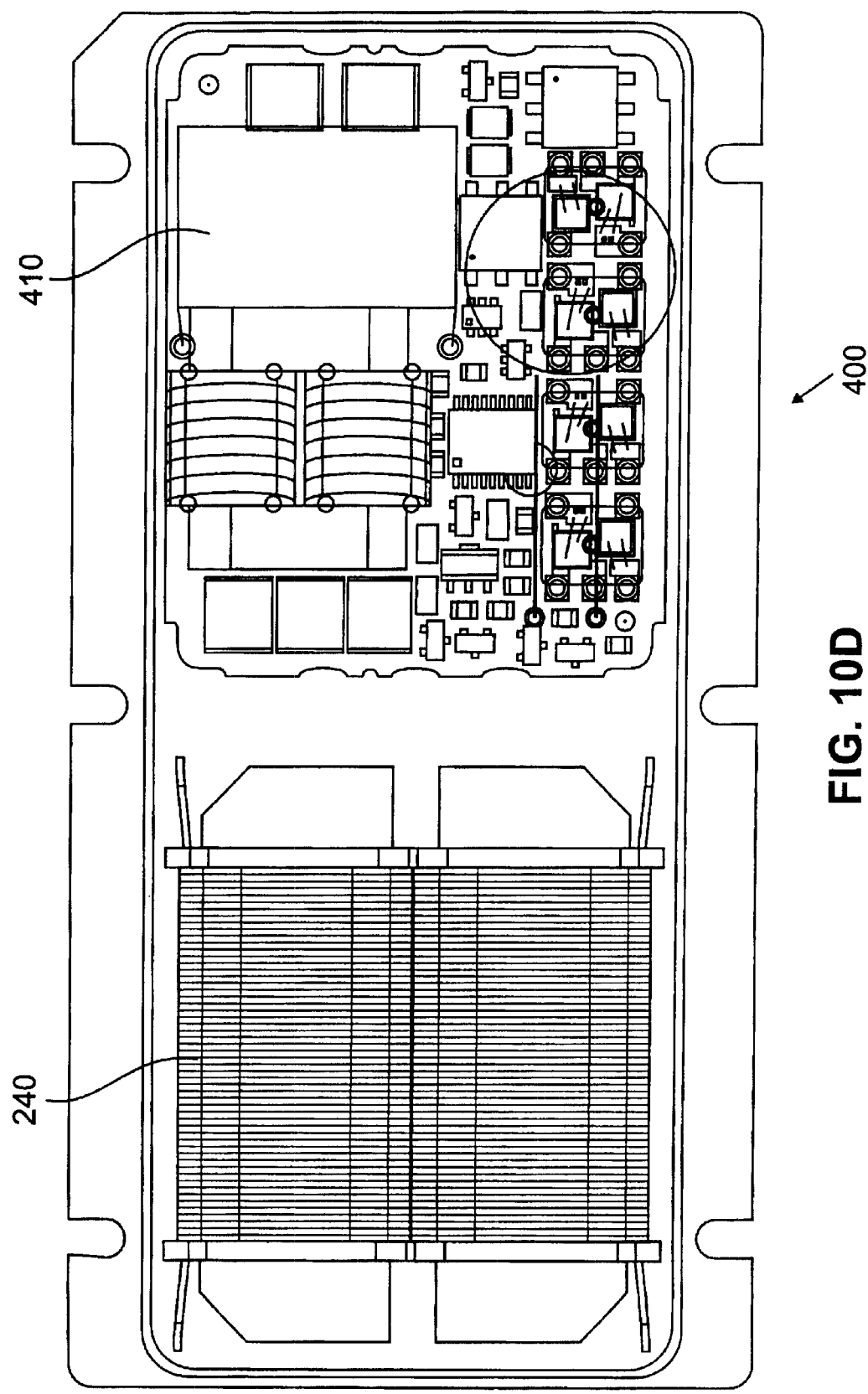
FIG. 10D is a top sectional view of a hybrid module.

In another embodiment, the bridge rectifier, switch, and switch control circuit may be encapsulated with the inductor in a hybrid thermal management module 290 to increase the level of integration. Referring to FIG. 6A for example, the portion of the circuit including the inductors 204, 206, the bridge rectifier 108, the switch 210, and the switch control circuit 116 shown enclosed by dashed lines may be integrated into a single thermal management module 290. The circuit of FIG. 6A implemented using an integrated passive harmonic current control module 290 is shown in FIG. 6B with the external components. The filter capacitors 112, and 116 are not encapsulated with the other components. The thermal sensitivity of the capacitors favor thermal isolation from the heat dissipative components and so should not be encapsulated in the enclosure with the inductor. An example of a hybrid thermal management module 400 is shown in FIG. 10D. Referring to FIG. 10D, a circuit board 410 supporting electronic circuitry is shown at one end of the module 400 and the inductor 240 is located at the opposite end.

Figure 6C:
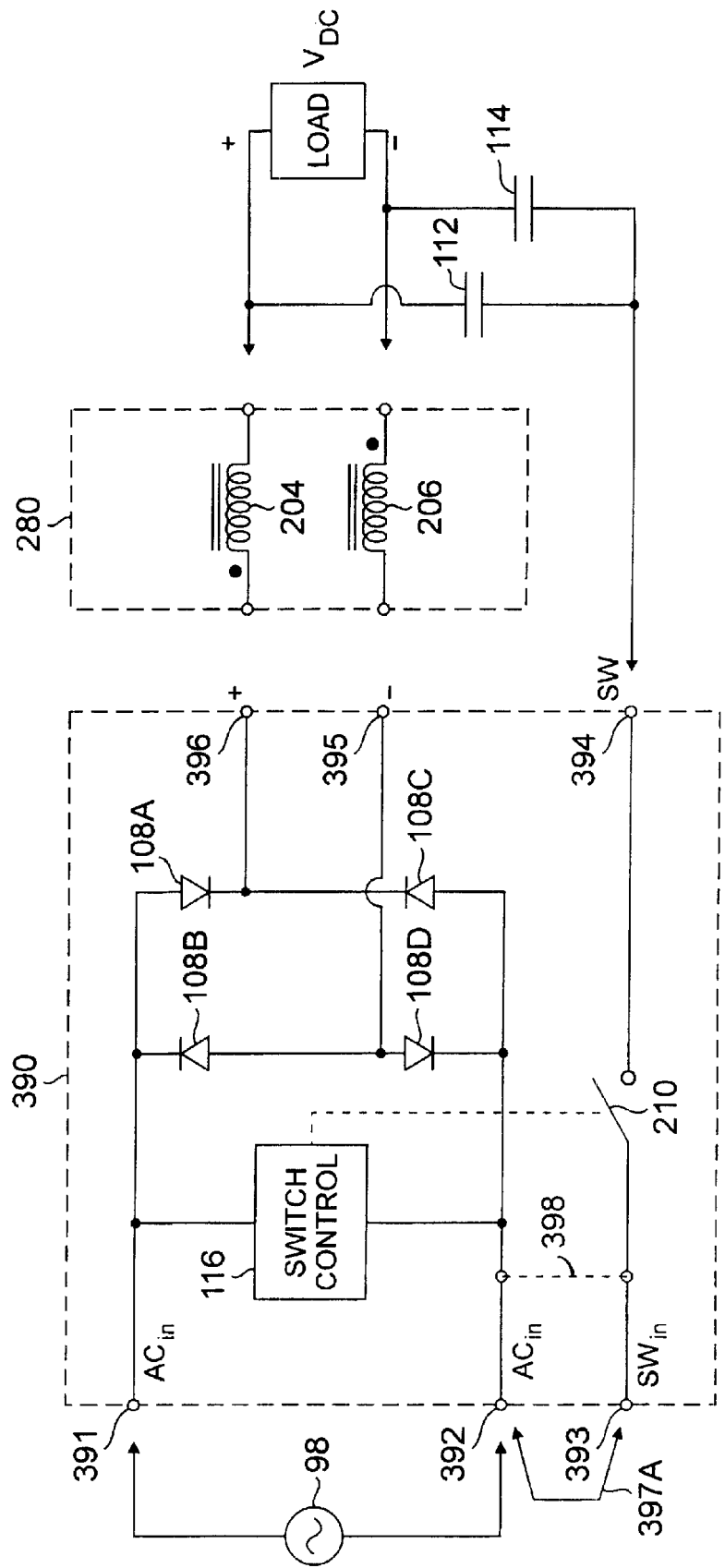
FIG. 6C is a schematic diagram of the circuit of FIG. 6A implemented using a set of universal current control modules.

Alternatively, the bridge rectifier, switch, and switch control circuit may be encapsulated together in a second thermal management module 390 that may be used in conjunction with the inductor module 280 of FIGS. 10A–C to provide additional configuration options. Referring to FIG. 6C, a universal passive current control module 390 is shown schematically connected with an inductor module 280 and the filter capacitors 112 and 114 to form the circuit of FIG. 6A. The universal module has two AC input terminals 391 and 392, switch input and output terminals 393, 394, and positive and negative output terminals 396, 395, respectively. As shown in the figure, the AC inputs are connected to the AC source and the positive and negative outputs are connected to the filter capacitors 112, 114 and the load through the inductor module 280. The switch output terminal is connected to the center tap connection of the filter capacitor for the voltage doubling circuit. The switch input terminal 393 is connected to one of the AC input terminals via jumper 397A. As shown in FIG. 6C, the universal module may be implemented using an internal connection 398 in place of the switch input terminal 393 to eliminate the jumper 397A, however, the substitution will necessarily limit the available configurations of the module.

Figure 7C:
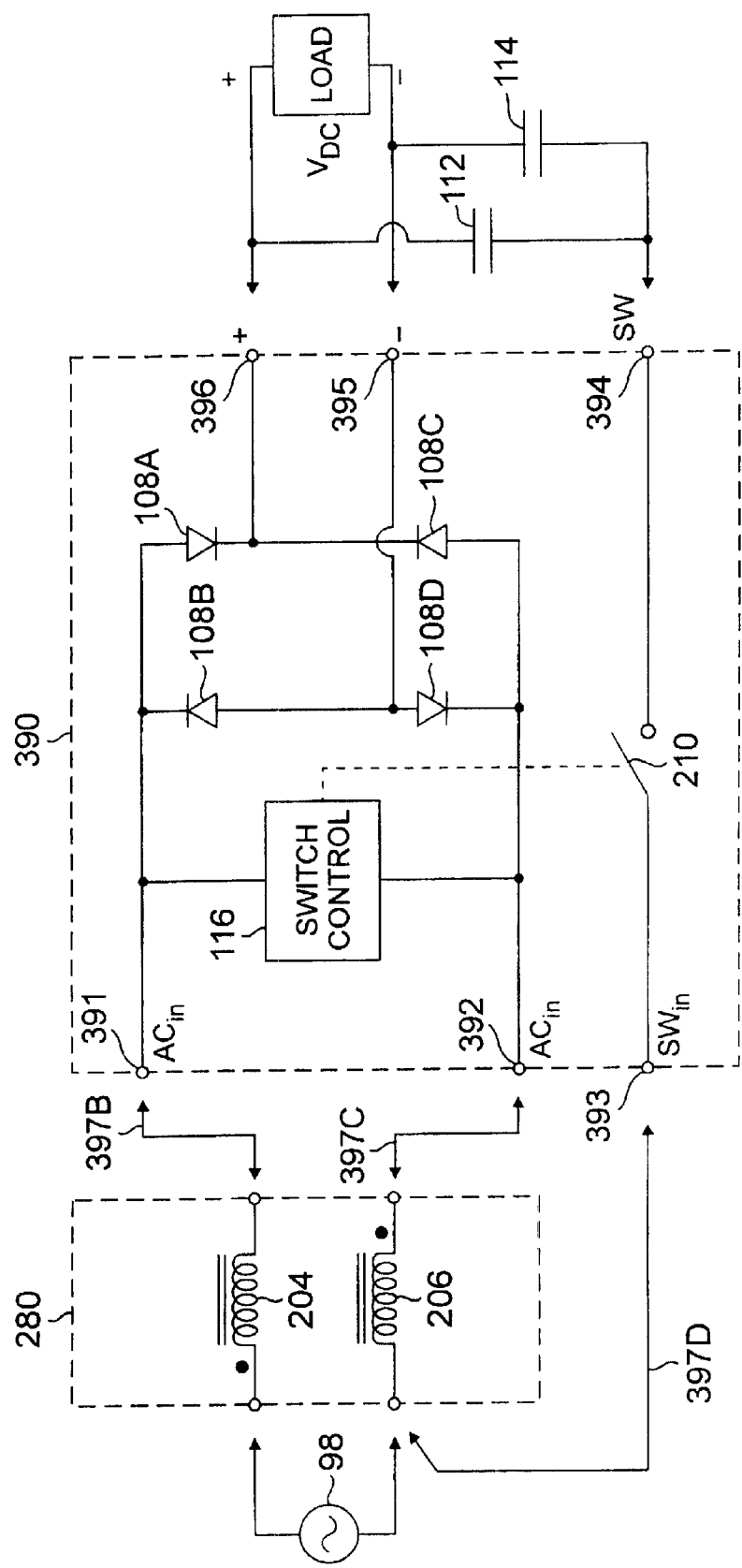
FIGS. 7C and 7D are schematic diagrams of the circuits of FIGS. 7A and 7B implemented using two universal current control modules.
Figure 7D:
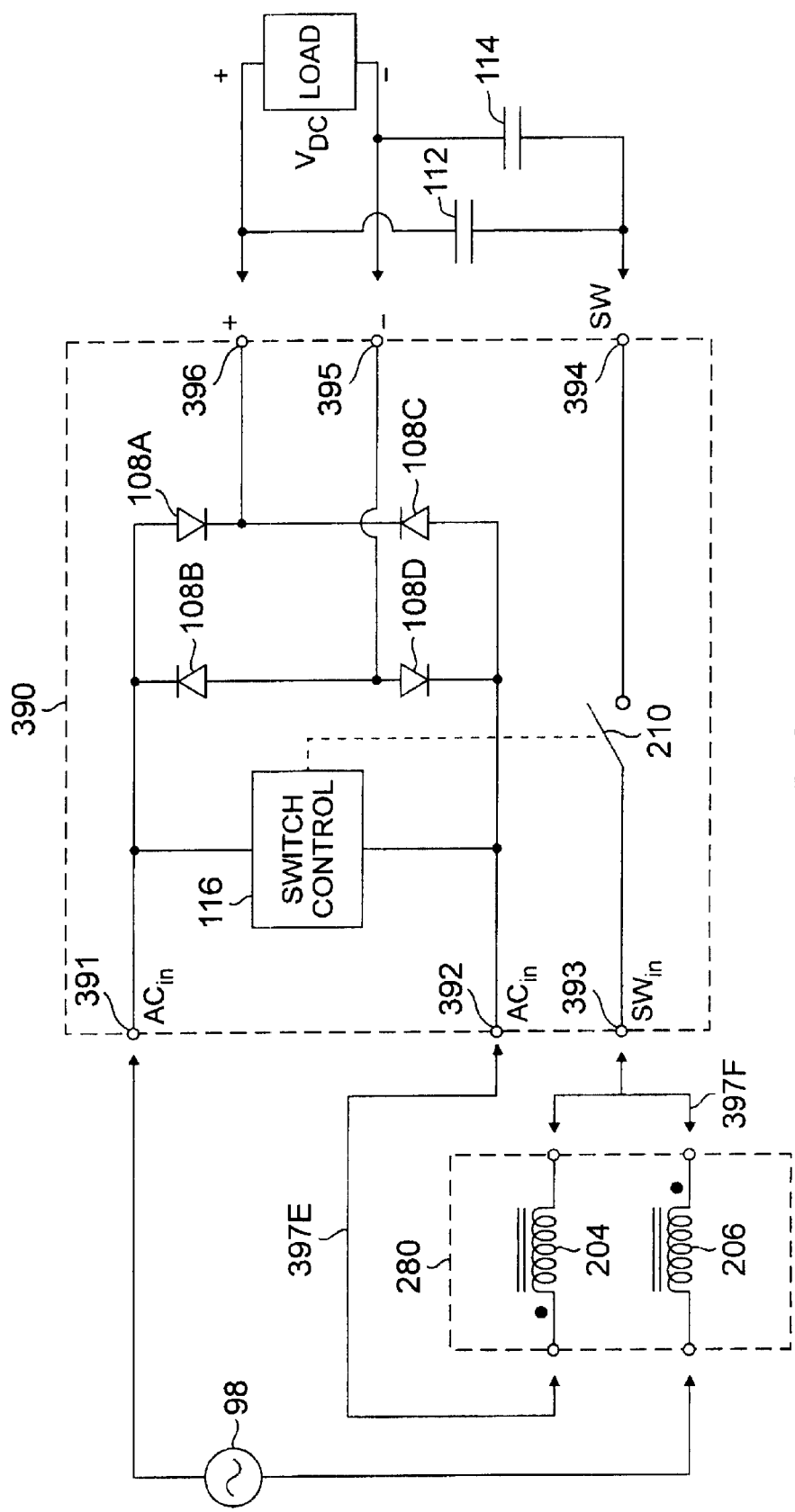

Referring to FIGS. 7C and 7D, the universal module 390 is shown schematically connected with inductor module 280 and filter capacitors 112 and 114 to form the circuits of FIGS. 7A and 7B, respectively with automatic switch control circuitry 116 added. It will be appreciated that with different external jumper connections 397, the universal module and inductor module may be used to form a variety of passive harmonic current control and passive power factor correction circuit configurations. Additional ancillary circuitry such as EMI filters (not shown) may be incorporated into modules 280, 290, and 390.

Because the core pieces 252a, 252b of the inductor 240 of FIG. 9 are relatively close to each other, there will be magnetic coupling between the windings 250a, 250b. Measurements of the inductor of FIG. 9 with the windings connected in parallel produced an inductance value of 615 micro Henries; in series produced a value of 5.17 milli Henries; and with one coil unconnected produced a value of 1.9 milli Henries. When used in the circuits of FIGS. 3, 6A–6C, and 7A–7D, the windings of a coupled inductor are connected with the magnetic polarities illustrated by the polarity dots adjacent to the inductors in each figure. Use of coupled windings improves the overall efficiency of the inductor in terms of inductance per unit volume. However, two uncoupled inductors can also be used in the circuits of FIGS. 3, 6A–6C, and 7A–7D.

FIGS. 8A through 8F show the results of comparative tests of six rectifier circuits. All tests are at a nominal load level of 372 Watts. Each Figure shows: (1) a value of Load Power, in Watts; (2) a value of Load Current, which is the rms value of current reflecting the actual real power delivered to the load and which is calculated by dividing the Load Power by the AC source voltage; (3) a value of Harmonic Current, which is the rms value of the total of the $2^{nd}$ through $40^{th}$ harmonic components of the current drawn from the AC source and which is calculated by taking the square root of the sum of the squares of the measured values of each such harmonic component; and (4) the actual measured rms values of odd harmonic components 3 through 15 of the current drawn from the AC source (the values of even harmonics are negligibly small; the values of harmonics above the fifteenth continue to decline to negligibly small values).

Figure 1:
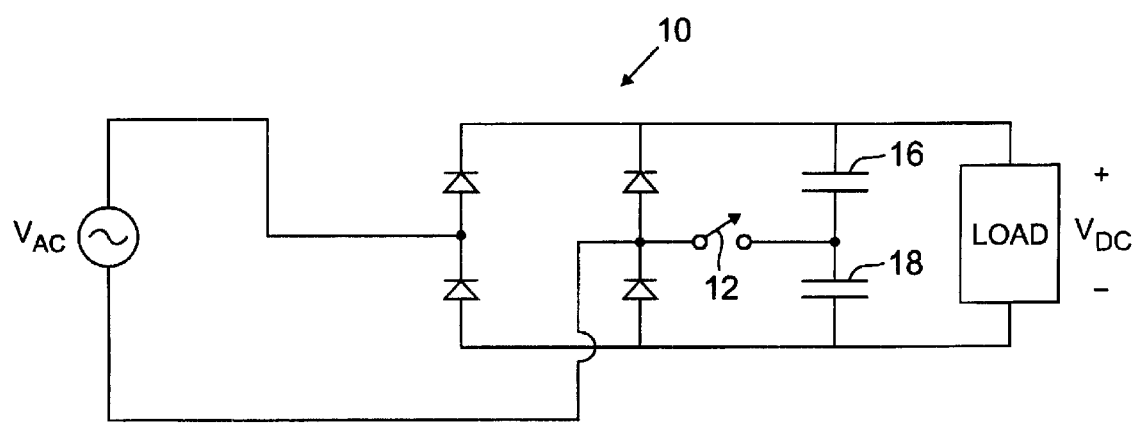
FIG. 1 is a schematic diagram of a capacitively loaded rectifier circuit.

FIGS. 8A and 8B are baseline tests showing the harmonic content of a capacitively-loaded rectifier circuit of the kind shown in FIG. 1 without any harmonic control circuitry. The difference in AC line frequency used in the two tests reflects the fact that 230 VAC, 50 Hz, utility lines are common in Europe; whereas 120 VAC, 60 Hz, utility lines are common in the US. The storage capacitors 16, 18 are each 2200 microfarads, 200 Volts, aluminum-electrolytic type (part number 82AO61, manufactured by Nippon Chemicon).

FIGS. 8C and 8D show the results of tests of a circuit of the kind shown in FIG. 3 using the inductor of FIG. 9. The storage capacitors 112, 114 are the same as those used for capacitors 16, 18 in the circuit of FIG. 1 above. FIG. 8C is for operation at 230 VAC, 50 Hz, input with the range-selector switch 110 open; FIG. 8D is for operation at 120 VAC, 60 Hz, input with the range-selector switch closed. The harmonic currents in the circuit of FIG. 3, as shown in FIGS. 8C and 8D, are reduced by at least 13.7 percent and 8.2 percent, respectively, relative to the harmonic currents in FIGS. 8A and 8B for the circuits of FIG. 1 operating, respectively, at the same input voltage and load and with the same range selector switch settings.

FIGS. 8E and 8F show the results of tests of a circuit of the kind shown in FIG. 6A using the inductor of FIG. 9. The storage capacitors 112, 114 are the same as the capacitors 16, 18 used in the circuit of FIG. 1 above. FIG. 8E is for operation at 230 VAC, 50 Hz, input with the range-selector switch 210 open; FIG. 8F is for operation at 120 VAC, 60 Hz, input with the range-selector switch closed. The harmonic currents in the circuit of FIG. 6A, as shown in FIGS. 8E and 8F, are reduced by at least 13.8 percent and 16.4 percent, respectively, relative to the harmonic currents in FIGS. 8A and 8B for the circuits of FIG. 1 operating, respectively, at the same input voltage and load and with the same range selector switch settings.

The circuits of FIG. 3 and FIG. 6A both provide a reduction in harmonic content, and thus an improvement in power factor, relative to the circuit of FIG. 1. However, the harmonic currents of the circuit of FIG. 6A, as shown in FIGS. 8E and 8F, are lower than the harmonic currents of the circuit of FIG. 3, as shown in FIGS. 8C and 8D, respectively. The circuit of FIG. 6A provides better harmonic attenuation and also, as described above, is simpler to implement (because it requires only a single-pole single-throw switch) than the circuit of FIG. 3. However, as noted above, for equivalent components and operating conditions, the power dissipation in the inductors of FIG. 6A at low input voltages (with the range selector switch 210 closed) will be higher than the dissipation in the inductors in the circuit of FIG. 3.

Figure 11A:
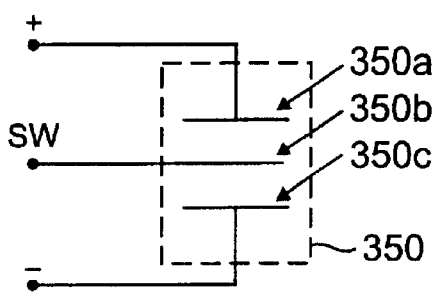
FIG. 11A shows an integrated three-plate three-terminal capacitor for use in place of capacitors 112 and 114 of FIGS. 3–7B.
Figure 11B:
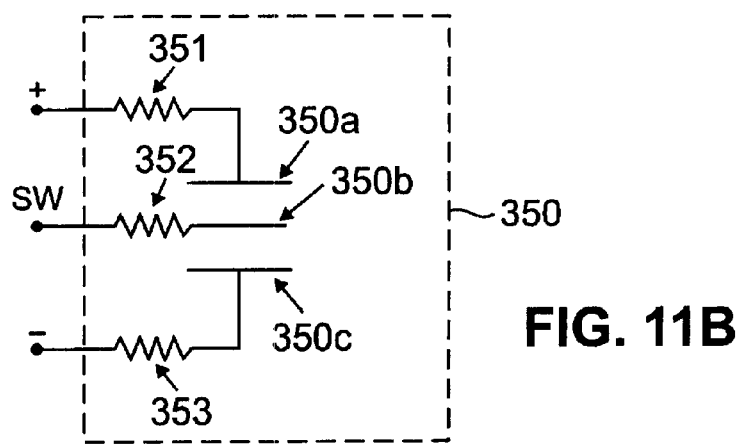
FIG. 11B is an equivalent circuit of the integrated capacitor of FIG. 10A.

Referring to FIG. 11A, a preferred filter capacitor 350 for use with the circuits of FIGS. 37D in place of capacitors 112 and 114 is shown. As shown, capacitor 350 has three plates, 350A, 350B, and 350C that are respectively connected to the positive side of the load, the switch, and the negative side of the load. The advantages of the integrated three-plate capacitor 350 over the two discrete capacitors 112, 114 are more clearly appreciated with reference to the respective equivalent circuits shown in FIGS. 11B and 11C.

Figure 11C:
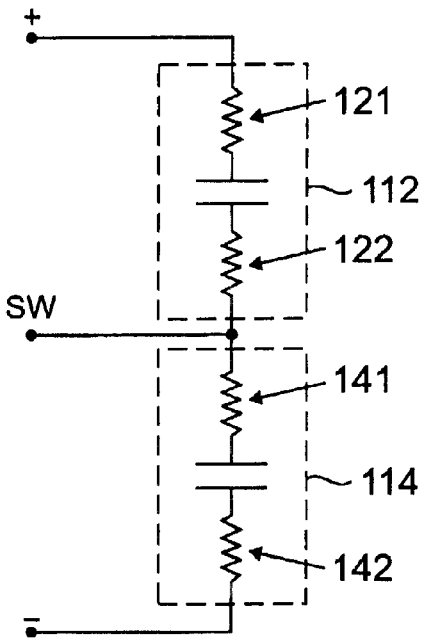
FIG. 11C is an equivalent circuit of the capacitors 112 and 114 of FIGS. 3–7B.

In FIG. 11C, under full-wave rectification (with the switch open), the current flowing through the capacitors 112 and 114 must flow through four plates each creating resistance to the current flow. If the resistance of each plate, 121, 122, 141, and 142 is R, the total equivalent series resistance ("ESR") will be 4R. Now referring to FIG. 11B, the same current flowing through the capacitor 350 only flows through two plates 350A and 350B. The center plate 350B floats in the middle at a potential half way between the two end plates, 350A and 350B. The total ESR is then only 2R providing a two-fold improvement over the discrete capacitors. Even greater improvements in ESR may be realized if the volumetric efficiency of the three plates over four plates and the one package over two packages is spent on lowering the plate resistance. The ESR of the middle plate may be reduced in comparison to the end plates using the volume savings presented by the integrated three-plate device to also reduce the power dissipation in the doubler mode (when the switch is closed). The three-plate capacitor therefore reduces ESR losses and further reduces the size of the circuit thereby allowing for greater power densities.

A number of embodiments of the invention have been described. Nevertheless, it will be understood that various modifications may be made without departing from the spirit and scope of the invention. Although a preferred inductor core has been described, any type of core material and configuration that can support the required flux excursion and ampere-turns may be used, such as a gapped E-core, a powdered metal toroid, cut C-core sections and so on. Accordingly, other embodiments are within the scope of the following claims.

What is claimed is:

1. An apparatus for controlling the current drawn from an AC input and delivering a DC voltage to a load, comprising:

a bridge rectifier having a first and a second input for receiving power from the AC input, a positive output, and a negative output;

two capacitances each having one plate connected to a center tap and one plate connected to a respective end tap;

a first filter inductance connected in series between the positive output of the bridge rectifier and a first end tap;

a second filter inductance connected in series between the negative output of the bridge rectifier and a second end tap;

a range switch connected in series between the second input of the bridge rectifier and the center tap for doubling the output voltage when the switch is closed;

the first and second end taps connected to feed the load; and wherein the first inductance is connected so that when it carries a current, the instantaneous value of the current equals the sum of the currents in the load and in the capacitance connected to the first end tap; and wherein the second inductance is connected so that when it carries a current, the instantaneous value of the current equals the sum of the currents flowing in the load and in the capacitance connected to the second end tap.

2. The apparatus of claim 1 wherein the inductances are magnetically coupled to provide a mutual inductance.

3. The apparatus of claim 2 wherein the inductances are poled such that the flux generated by a current flowing from the positive output of the bridge rectifier to the first end tap aid the flux generated by a current flowing from the second end tap to the negative output of the bridge rectifier.

4. The apparatus of claim 1 wherein the inductances are the same.

5. The apparatus of claim 1 wherein the first inductance carries current during the positive half cycles of the AC input and the second inductance carries current during the negative half cycles of the AC input.

6. The apparatus of claim 1 wherein the first and second inductances carry current during every half cycle of the AC input.

7. The apparatus of claim 1 wherein the switch is a single-pole switch.

8. An apparatus for controlling the current drawn from an AC input and delivering a DC voltage to a load, comprising:

a rectifier having inputs for receiving power from the AC input and outputs for delivering a rectified output;

an output filter capacitance connected across the load;

a first filter inductance and a second filter inductance connected to carry current from the rectifier output to the capacitance;

a switch connected to allow current to flow in the first and second inductances during both half cycles of the AC input with the switch in a first position and to prevent current from flowing in the first inductor during negative half cycles and in the second inductor during positive half cycles with the switch in a second position; and wherein the first and second inductances are connected so that when either inductance carries a current, the instantaneous value of the current equals the sum of the current in the load and the current in the capacitance.

9. The apparatus of claim 8 wherein the apparatus performs voltage doubling when the switch is in the second position.

10. The apparatus of claim 8 wherein the inductances are magnetically coupled to provide a mutual inductance.

11. The apparatus of claim 10 wherein the inductances are poled such that the flux generated by a current flowing in the first inductance aids the flux generated by the current flowing in the second inductance when the switch is in the first position.

12. The apparatus of claim 8 wherein the inductances are the same.

13. The apparatus of claim 8 wherein the switch is a single-pole switch.

14. An apparatus for controlling the current drawn from an AC input and delivering a DC voltage to a load, comprising:
    a rectifier having inputs for receiving power from the AC input and outputs for delivering a rectified output;
    an output filter capacitance connected across the load;
    a filter inductance connected between the rectifier and the filter capacitance; and
    a switch connected to effect voltage doubling in a second position; and
    wherein the inductance is connected so tint when it carries a current, the instantaneous value of the current equals the sum of the current in the load and the current in the capacitance.

15. Au apparatus for controlling the current drawn from an AC input and delivering a DC voltage to a load, comprising:
    a rectifier having first and second inputs for receiving power from the AC input and outputs for delivering a rectified output;
    a first filter inductance connected between the first input and the AC input;
    a second filter inductance connected between the second input and the AC input;
    an output filter capacitance connected across the load; and
    a switch connected to effect voltage doubling and bypass the second inductor in a second position; and
    wherein the first and second inductances are connected so that when either inductance carries a current, the instantaneous value of the current equals the sum of the current in the load and the current in the capacitance.

16. The apparatus of claim 15 wherein the rectifier comprises a bridge rectifier.

17. The apparatus of claim 15 wherein the rectifier is connected as a full wave rectifier when the switch is a first position.

18. The apparatus of claim 15 wherein the current flows in the first and second inductances when switch is in the first position and current flows only in the first inductor when the switch is in the second position.

19. The apparatus of claim 15 wherein the filter capacitance comprises a first capacitance and a second capacitance connected in series at a center tap.

20. The apparatus of claim 19 wherein the switch, when in the second position, provides a closed circuit between the center tap and one side of the AC input.

21. The apparatus of claim 19 wherein the filter capacitance comprises a three-plate integrated capacitor.

22. The apparatus of claim 18 wherein the first and second inductances each comprise an inductor having an inductance and a resistance;
    the inductance of the first inductor equals the inductance of the second inductor; and
    the resistance of the first inductor is less than the resistance of the second inductor.

23. The apparatus of claim 22 wherein the resistance of the first inductor is half of the resistance of the second inductor.

24. The apparatus of claim 22 wherein the inductors are magnetically coupled to provide a mutual inductance.

25. The apparatus of claim 24 wherein the inductors are poled such that the flux generated by a current flowing in the first inductor from the AC input to the rectifier aids the flux generated by a current flowing in the second inductor from the rectifier to the AC input.

26. An apparatus for controlling the current drawn from an AC input and delivering a DC voltage to a load, comprising:
    a rectifier having first and second inputs for receiving power from the AC input and outputs for delivering a rectified output;
    a series circuit including a first filter inductance and a second filter inductance connected at a center tap;
    the series circuit being connected between the AC input and the second input;
    an output filter capacitance connected across the load; and
    a switch connected to the center tap to effect voltage doubling in a second position; and
    wherein the first and second inductances are connected so that when either inductance carries a current, the instantaneous value of the current equals the sum of the current in the load and the current in the capacitance.

27. The apparatus of claim 3, 9, 14, 15, 19, or 26 wherein the capacitor comprises a three-plate integrated capacitor.

28. The apparatus of claim 2, 10, 14, 18, or 26 wherein the inductances are contained within a thermally conductive encapsulant filled enclosure.

29. The apparatus of claim 28 wherein the enclosure further comprises a base plate.

30. The apparatus of claim 28 wherein the rectifier is encapsulated with the inductances in the enclosure.

31. The apparatus of claim 28 wherein control circuitry is encapsulated with the inductances in the enclosure.

32. The apparatus of claim 28 wherein the capacitances are physically external to the inductance enclosure.

33. The apparatus of claim 1, 8, 14, 15, or 26 further comprising switch control circuitry for sensing the AC input voltage level and operating the switch to effect voltage doubling when the level is below a predetermined threshold.

34. The apparatus of claim 33 wherein the rectifier, switch, and switch control circuitry are packaged in a first module.

35. The apparatus of claim 34 wherein the inductances are packaged in a second module.

36. The apparatus of claim 35 wherein the first and second modules each further comprises a base plate and is filled with a thermally conductive encapsulant for removing heat.

37. The apparatus of claim 36 wherein the capacitances are physically external to the first and second modules.

38. An apparatus for controlling the current drawn from an AC input and delivering a DC voltage to a load, comprising:
    a thermal management enclosure housing internal circuitry, the enclosure including a thermally conductive base plate, an electrically insulative cover, input terminals for connection to the AC input, output terminals for connection to a load, and a thermally conductive encapsulant for filling the free space within the enclosure;
    the internal circuitry comprising,
        a rectifier having inputs connected to the input terminals for receiving power from the AC input and outputs for delivering a rectified output;

a filter inductance connected between the outputs of the rectifier and the output terminals; and a switch connected to effect voltage doubling when set in a second position with a filter capacitor connected to the output terminals.

39. The apparatus of claim 38 wherein the internal circuitry further comprises a switch controller connected to control the switch.

40. The apparatus of claim 38 or 39 wherein the filter capacitor is external to the enclosure.

41. The apparatus of claim 1, 8, 14, 15, 26, or 38, wherein the apparatus passively performs power factor correction.

42. The apparatus of claim 1, 8, 14, 15, 26, or 38, wherein the apparatus passively performs harmonic current control.

43. The apparatus of claim 1, 8, 14, 15, 26, or 38, wherein the inductances have an inductance value tat causes attenuation of odd current harmonics by at least 8 percent compared to an equivalent apparatus with zero inductance.

44. The apparatus of claim 1, 8, 14, 15, 26, or 38, wherein the inductances have an inductance value that causes attenuation of current harmonics in an amount sufficient satisfy the requirements of EN61000-3-2 compared to an equivalent apparatus with zero inductance.

45. An apparatus for controlling the current drawn from an AC input and delivering a rectified voltage to a load, comprising:

at least two inputs for receiving power from an AC source;

at least two outputs for delivering the rectified voltage to the load;

unidirectional conduction paths between the input and output for rectifying the AC input;

at least one filter capacitance connected across the output;

first and second filter inductances connected to carry current between the input and the load and having an inductance value, L, which causes attenuation of odd harmonic currents drawn from the input by at least eight percent compared to an equivalent apparatus having zero inductance; and a switch connected to in a second position effect voltage doubling and prevent current from flowing in one of the inductances;

wherein the first and second inductances are connected so that when either inductance carries a current, the instantaneous value of the current equals the sum of the current in the load and the current in the capacitance.

46. The apparatus of claim 45 wherein the switch prevents current from flowing in the second inductance during positive and negative half cycles of the AC input.

47. The apparatus of claim 45 wherein the switch prevents current from flowing in the first inductance during positive half cycles and in the second inductance during negative half cycles of the AC input.

* * * * *

UNITED STATES PATENT AND TRADEMARK OFFICE
CERTIFICATE OF CORRECTION

| | | |
|---|---|---|
| PATENT NO. | : 6,608,770 B2 | Page 1 of 1 |
| APPLICATION NO. | : 09/944737 | |
| DATED | : August 19, 2003 | |
| INVENTOR(S) | : Patrizio Vinciarelli and Alan R. Rockenbach | |

It is certified that error appears in the above-identified patent and that said Letters Patent is hereby corrected as shown below:

Column 13, Claim 14, Line 22, "so tint when it carries" should be replaced with --so that when it carries--

Column 13, Claim 15, Line 26, "Au apparatus for controlling" should be replacing with --An apparatus for controlling--

Column 15, Claim 43, Line 17, Line 17, "an inductance value tat causes" should be replaced with --an inductance value that causes--

Signed and Sealed this

Fifth Day of June, 2007

JON W. DUDAS
*Director of the United States Patent and Trademark Office*